June 24, 1930. W. G. SCHRÖDER 1,768,156
COOLING DRUM
Filed May 16, 1928
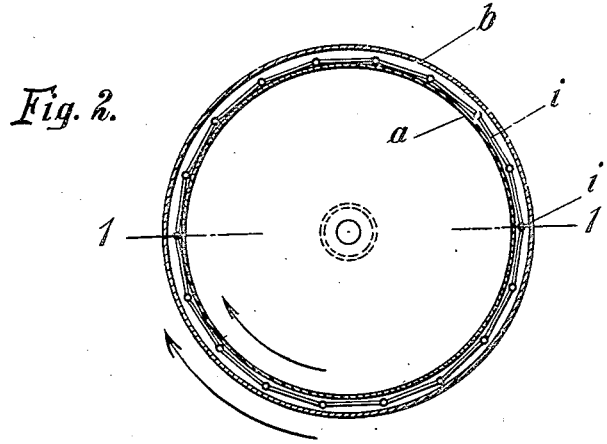
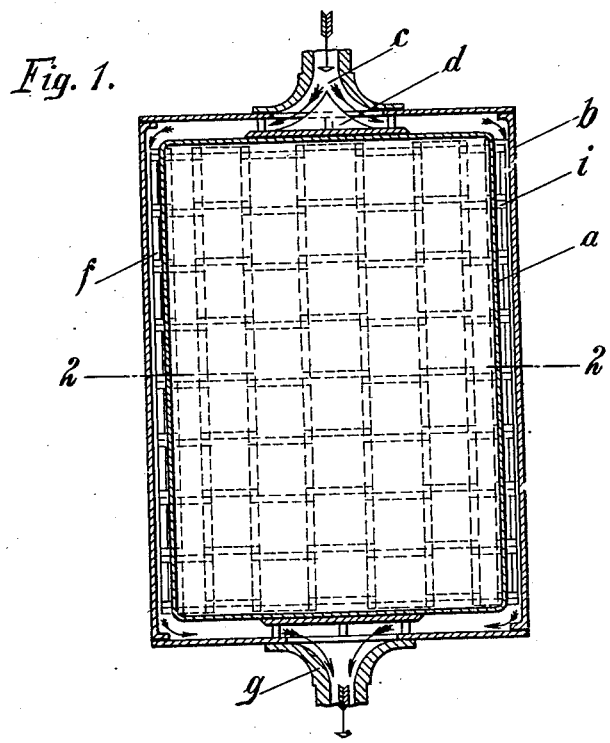
Inventor:
Wilhelm G. Schröder,
By Sturtevant & Mason,
Attorneys.

Patented June 24, 1930

1,768,156

UNITED STATES PATENT OFFICE

WILHELM GOTTHILF SCHRÖDER, OF LUBECK, GERMANY

COOLING DRUM

Application filed May 16, 1928, Serial No. 278,163, and in Germany May 21, 1927.

The invention relates to cooling drums of the type in which cooling medium flows through the annular space between a double walled drum. Such cooling drums are known and have been used in various ways, in the first place by allowing the cooling medium to flow in through the hollow shaft and flow freely through the whole cylindrical space between the two walls of the drum, being finally discharged through the other hollow shaft. In this arrangement the exchange of heat is relatively small, so that only an insufficient cooling efficiency is obtained. An attempt has been made to improve the exchange of heat by subdividing the space between the two walls into continuous channels of helical or similar form, so compelling the cooling medium to travel through the space along a definite, more or less tortuous path. This improved somewhat the exchange of heat, but had the disadvantage that the necessary flow of the brine through narrow channels caused considerable friction between the brine and the sides of the channels so that there were considerable thermal losses.

The object of the invention is further to improve the exchange of heat in such cooling drums. The inventor has recognized the fact that a much more intensive exchange of heat is possible without causing considerable harmful friction if the annular cooling space is provided with agitating means which cause the flowing cooling medium to become agitated and press it against the outer drum side. The exchange of heat is very considerably improved by this active movement of the brine. The centrifugal force developed during the quick revolution of the drum helps to lead the brine against the outer side of the drum, an effect which can be promoted and increased by suitable shape of the fitted agitating means.

The desired agitating effect can be obtained according to the invention by fitting obstacles in the hollow cylindrical cooling space. The quickly flowing brine becomes agitated on meeting these obstacles, and is brought at the same time towards the outside. Preferably the object of the invention is realized by equipping the inner side of the drum with a network of chain links, wires, or the like. The uneven parts of this network will act as an obstacle to flow of liquid and cause a similar effect to be produced.

The drawing shows an embodiment of the invention. In Fig. 1 is shown a section taken along the line 1—1 Fig. 2; Fig. 2 shows a section along the line 2—2 of Fig. 1.

The invention is shown as applied to a cooling drum the inner wall $a$ of which is rigidly connected to the outer wall $b$ so that they revolve together. The brine flows in through the hollow axle $c$ and is caused to flow in all directions by a conical distributor $d$; it then flows through the annular space $f$ between the two walls $a$ and $b$, and is finally discharged through the opposite hollow axle $g$.

The hollow cylindrical space $f$ is fitted, according to the invention, with obstacles in the form of a network $i$ surrounding the inner wall $a$, which network may consist of chain links, wire lattice, or the like. The network can lie with strengthened junction pieces on the inner wall $a$, in order to be kept at a proper distance from same. When flowing through the annular drum space the brine comes up against the network $i$ with the result that it is set into an agitated motion which results in increased exchange of heat, and assists the centrifugal force whilst the drum is rotating in throwing it against the outer wall.

Claim:

A cooling drum having in combination two walls defining a free annular space, means whereby cooling liquid may be admitted to and withdrawn from the drum at the ends thereof so that the liquid may flow through said annular space, and agitating means comprising a net work of wires located in said annular space to obstruct a portion of the flow of cooling medium in said space whereby to agitate it and cause it to be driven against the outer of said walls.

In testimony whereof I have signed my name to this specification.

WILHELM GOTTHILF SCHRÖDER.